Sept. 1, 1931.  M. E. REAGAN  1,821,358
MOTOR STARTING SYSTEM
Filed Feb. 1, 1928   2 Sheets-Sheet 1

INVENTOR
Maurice E. Reagan.
BY
ATTORNEY

Sept. 1, 1931.  M. E. REAGAN  1,821,358

MOTOR STARTING SYSTEM

Filed Feb. 1, 1928  2 Sheets—Sheet 2

INVENTOR
Maurice E. Reagan.
BY
ATTORNEY

Patented Sept. 1, 1931

1,821,358

UNITED STATES PATENT OFFICE.

MAURICE E. REAGAN, OF SWISSVALE, PENNSYLVANIA, ASSIGNOR TO WESTINGHOUSE ELECTRIC & MANUFACTURING COMPANY, A CORPORATION OF PENNSYLVANIA

MOTOR STARTING SYSTEM

Application filed February 1, 1928. Serial No. 251,035.

My invention concerns a starting system for electric motors, specifically, motors of the synchronous type, although it is not limited thereto.

In starting a large synchronous motor, it is important that the field winding of the motor be excited very little during the starting period, or until the motor has reached synchronous speed. It is also important that the motor-field current, at the transfer from starting to running connections shall correspond to the line voltage.

One object of my invention is to so design a starting system for synchronous motors that the motor-field current shall be limited to a low value during the starting period.

Another object of my invention is to provide means whereby the motor-field current may be increased to its normal value when the motor reaches synchronous speed.

A further object of my invention is to cause the transfer from starting to running connections to occur at the optimum value of motor-field current, which is dependent upon the supply voltage.

A still further object of my invention is to positively prevent transfer from starting to running connections until the voltage applied to the motor field attains a predetermined relation to the voltage of the supply line.

In accordance with my invention, a synchronous motor is started on a reduced voltage, the field winding being shunted through a resistor. A direct-connected exciter generator is provided for supplying current to the motor field, and the field circuit of the exciter generator is also provided with a resistor. After a lapse of time during which the motor accelerates to synchronous speed, the resistor in the field circuit of the exciter generator is short-circuited, and the generator field current is thereby increased to its normal value. The transfer from starting to running connections is controlled by a balance relay having opposing windings subject to line voltage and to exciter-generator voltage, respectively, whereby transfer is caused when the exciter-generator voltage bears a definite relation to the line voltage. Under these conditions, the excitation of the motor field likewise bears a definite relation to the line voltage.

Figure 1:
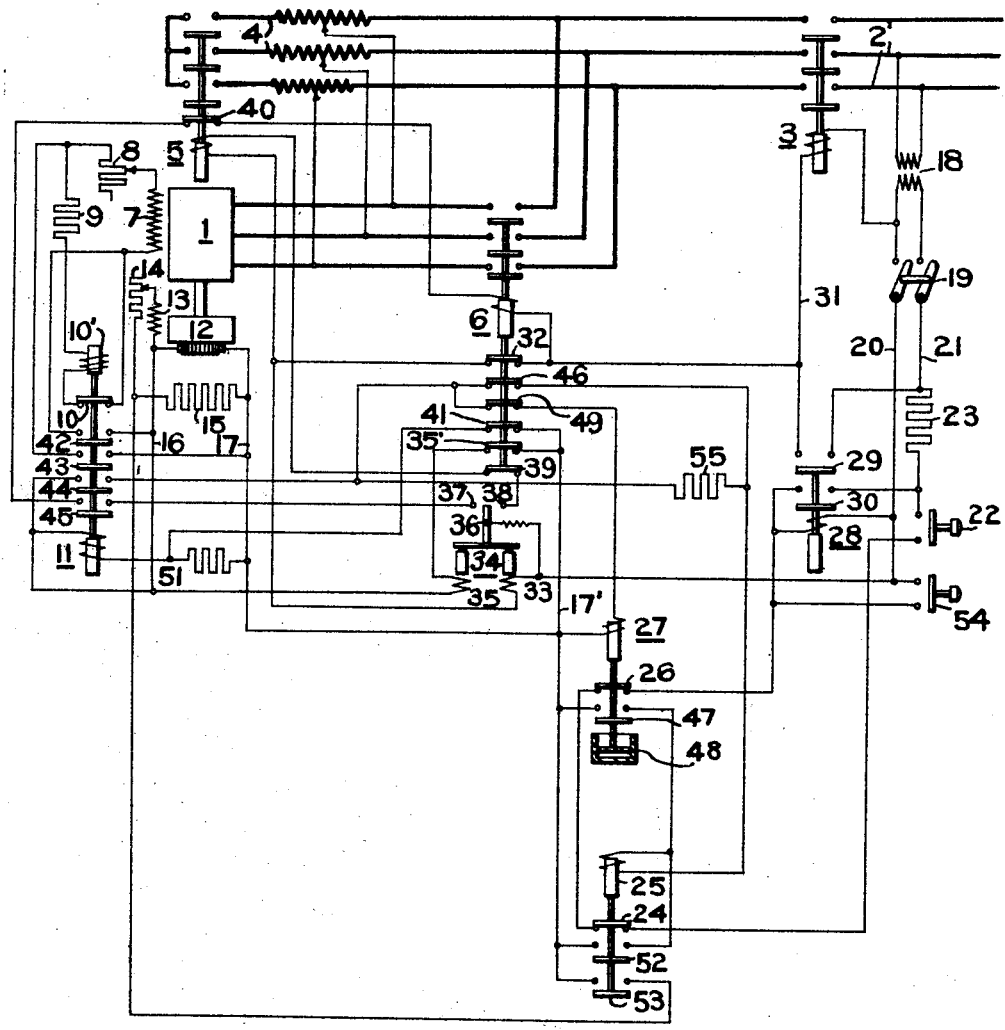
Figure 2:
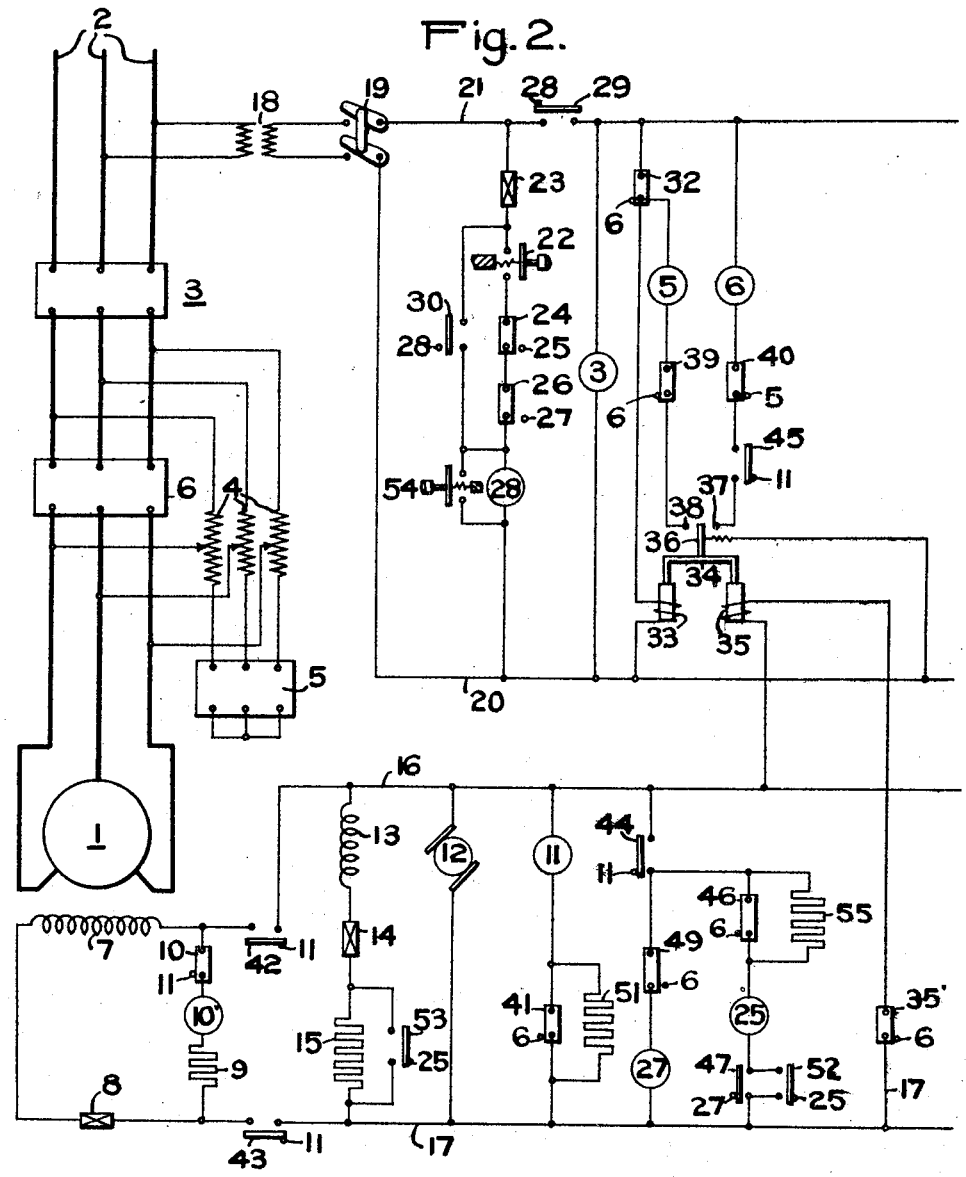

For a complete understanding of my invention, reference may be had to the accompanying drawings, Figure 1 of which is a complete circuit diagram of the starting system of my invention; and Fig. 2 is a schematic diagram of the same circuit shown in full in Fig. 1.

Referring to Fig. 1, the synchronous motor 1 is adapted to be started and driven by energy supplied from a source 2 through a main circuit breaker 3. Starting compensators 4 and a starting switch 5 are provided for starting the motor on reduced voltage.

A running switch 6 is also provided for connecting the motor 1 directly to the source 2 through the main circuit breaker 3.

The motor 1 is provided with a field winding 7, the circuit of which, when the system is de-energized, includes a rheostat 8, a resistor 9, a restraining coil 10' of a relay 11, and a contact 10, which is opened by the operation of the relay 11. The coil 10', when energized, tends to maintain the contacts of the relay 11 in their lower positions.

A direct-current generator 12 is driven by the motor 1 and may be of sufficient capacity merely to supply the necessary excitation for the motor field or it may be large enough also to supply an external load. The generator 12 is furnished with a field winding 13, which, with a rheostat 14 in series, serves to control the generator excitation. The field circuit of the generator includes also a resistor 15 which is arranged to be short-circuited during the starting operation, as will be hereinafter more fully described. The generator 12 supplies current to direct-current control busses 16 and 17 and may, as above stated, also supply an external load.

Energy for the operation of the alternating-current control devices is taken from the source 2 through a transformer 18. A switch 19 controls the energization of alternating-current control busses 20 and 21.

The control elements of my starting system and their functions will be described during the progress of the description of operation, which will now be given.

According to my invention, the starting of the motor 1 may be initiated by the closing of a switch 22, which is illustrated as a push-button switch, although it is to be understood that the said switch may be automatically controlled, or may be operated from some remote point by any suitable system of remote control. The closing of the switch 22 completes a circuit from the alternating-current control bus 21, through a resistor 23, the switch 22, a contact 24 of a relay 25, which is closed when the relay 25 is de-energized, and a contact 26 of a relay 27 which is closed when the relay 27 is de-energized, the operating coil of the relay 28, and thence to the control bus 20. The establishment of this circuit causes the relay 28 to be energized to close its contacts 29 and 30.

The closing of the contact 30 completes a locking circuit for the coil of the relay 28, shunting the switch 22, contact 24 and contact 26. The closing of the contact 29 energizes an auxiliary control bus 31. The energization of the bus 31 causes current to be supplied to the operating coil of the main circuit breaker 3, which is thereupon closed. Simultaneously, a circuit is completed from the control bus 31, through a contact 32, which is closed when the running switch 6 is open, through a coil 33 of a balance relay 34 and thence to the control bus 20.

The balance relay 34 is also provided with a winding 35 which is energized by the exciter generator 12, the circuit including the bus 16, the coil 35, the contact 35', which is closed when the running switch 6 is open, conductor 17' and the bus 17. The relay 34 is also provided with a moving contact 36 and stationary contacts 37 and 38. The relay is so designed that, when the coils 33 and 35 are energized by currents having predetermined relative values, the contact 36 will engage the contact 37 or the contact 38, as will be hereinafter described.

The energization of the coil 33 resulting from the connection of the bus 31 to the bus 21, causes the contact 36 of the relay 34 to engage the contact 38. This operation completes a circuit from the bus 31 through the contact 32, through the operating coil of the starting switch 5, the contact 39, which is closed when the running switch 6 is open, contact 38, contact 36 and thence to the control bus 20. The completion of this circuit results in the closing of the main contacts of the starting switch 5. Reduced voltage is thereby applied to the armature of the motor 1, and the motor starts in the well known manner.

As the speed of the motor increases, the voltage generated by the exciter generator 12 likewise increases and the current induced in the motor-field circuit by the rotating field set up by the armature decreases. When the voltage of the exciter generator has increased and the motor-field current decreased to predetermined values, the relay 11 is actuated, its lower coil being connected across the busses 16 and 17 in series with a contact 41, which is closed when the running switch 6 is open. The operation of the relay 11 opens the contact 10 to remove the shunt resistor 9 from across the circuit of the motor field winding and to de-energize the upper restraining coil 10', and closes the contacts 42 and 43 to connect the motor field to the generator busses 16 and 17, respectively. The operation of the relay 11 also closes the contacts 44 and 45. The closing of the contact 44 connects the operating coil of the relay 27 and the contact 49, which is closed when the running switch 6 is open in series across the busses 16 and 17.

The relay 27 operates, after a certain time delay introduced by any convenient means, such as a dash-pot 48, to close its contact 47 and to open the contact 26. The opening of the contact 26 has no effect on the remainder of the circuit since it is already shunted by the contact 30 of the relay 28. The closing of the contact 47, however, completes a circuit from the bus 17 to the conductor 17', through the contact 47, the operating coil of the relay 25, the contact 46 and the contact 44, to the bus 16.

The time delay introduced by the relay 27 is for the purpose of allowing the motor to accelerate to substantially synchronous speed, whereupon the relay 25 operates as a result of the establishment of the circuit above outlined, closes its contacts 52 and 53 and opens its contact 24. The opening of the contact 24 is ineffective to change conditions in the control circuit since it is already shunted by the contact 30. The closing of the contact 52 completes a locking circuit for the coil of the relay 25 in parallel with the contact 47. The closing of the contact 53 short-circuits the resistor 15 in the field circuit of the exciter generator 12.

The relay 34 is so designed that, until the voltage of the exciter generator reaches a predetermined value, as a result of the short-circuiting of the resistor 15, the contact 36 will engage the contact 38. When the exciter generator voltage reaches the predetermined value, however, the energization of the winding 35 of the relay 34, which is connected across the generator busses, is sufficient to cause the contacts 36 and 38 to be disengaged and to cause the engagement of the contacts 36 and 37. The separation of contacts 36 and 38 interrupts the circuit through the operating coil of starting switch 5 which thereupon opens its main contacts and closes its back contact 40.

The engagement of contact 36 with contact 37 completes a circuit from the bus 20 through contact 36, contact 37, contact 45 which is closed when relay 11 is energized, contact 40, which is closed when the running switch 5 is open and the operating coil of the running switch 6, to the bus 31. The resulting operation of the running switch 6 connects the motor 1 directly to its source of supply 2, and the motor then runs at synchronous speed on full voltage and is ready to carry its load.

The closing of the running switch 6 causes the contacts 32, 46, 49, 41, 35' and 39 to be opened. The opening of the contact 32 disconnects the coil 33 of the relay 34 from the busses 31 and 20, and also further interrupts the circuit to the operating coil of starting switch 5.

The opening of the contact 46 removes a short-circuit from around a resistor 55 which remains in series with the operating coil of the relay 25. The resistor 55 is so designed that the current through the circuit is sufficient to maintain the relay in its energized position after it has been actuated thereto.

The opening of the contact 49 disconnects the operating coil of the relay 27 from the busses 16 and 17.

The opening of the contact 41 removes a short circuit from across a resistor 51, which remains in series with the operating coil of relay 11, the resistor 51 being of such value as to permit sufficient current to pass through the coil of the relay 11 to maintain it in its energized position.

The opening of the contact 35' disconnects the coil 35 of the relay 34 from the busses 16 and 17, and the opening of the contact 39 further interrupts the circuit to the operating coil of the starting switch 5.

It will thus be obvious that, when the starting operation has been complete, the relays 28, 25 and 11 and the running switch 6 are energized, and that the relay 27 and the starting switch 5 are de-energized.

When it is desired to stop the motor, this may be done by closing the switch 54, which, although shown as a push-button switch, may be automatically operated or remotely controlled. The closing of the switch 54 short-circuits the operating coil of the relay 28, which is thereupon de-energized and opens its contacts 29 and 30.

The opening of the contact 29 de-energizes the auxiliary bus 31 and, as a consequence causes the opening of the main circuit breaker 3 and the running switch 6. The motor is thereby disconnected from its source of supply and slowly decelerates.

As the motor speed decreases, the voltage generated by the direct-connected exciter 12 also decreases, resulting in the de-energization of the relays 11 and 25. The entire starting system is thereupon de-energized and is ready for a repetition of the starting cycle.

Fig. 2, showing a schematic diagram of the circuit shown in full in Fig. 1, will not be described in detail since the above description of operation may be also read in connection with Fig. 2.

It will be obvious from the above description of my invention and its operation, that I have provided a starting system for a synchronous motor in which the motor is started on reduced voltage, with its field winding shunted through a resistor, and that, after a time during which the motor accelerates to substantially synchronous speed, the motor armature is transferred to a source of full voltage, when the voltage generated by a direct-connected exciter generator attains a predetermined relation to the line voltage.

Although I have illustrated and described but a single embodiment of my invention, I do not wish to be limited thereto but desire that all changes and modifications such as may occur to those skilled in the art, which fairly fall within the scope of the appended claims, shall be included therein.

I claim as my invention:

1. A system for starting a synchronous motor comprising transformers connected to a supply circuit having starting and running taps and a direct-connected exciter generator for energizing the motor field winding, means for connecting the motor armature winding to said starting taps, a field resistor means for shunting the motor field winding through the resistor, means for opening said shunt and connecting the field winding to the exciter generator when the motor attains a predetermined speed, means including a time-delay relay for increasing the exciter voltage when the motor reaches synchronous speed, and automatic means for transferring the armature from the starting to the running taps responsive to a predetermined relation between the exciter voltage and the voltage of the supply circuit.

2. A system for starting a synchronous motor from a supply circuit comprising means for applying reduced voltage from the supply circuit to the motor armature, means for shunting the field winding, an exciter actuated in accordance with the speed of the motor, means for opening the shunt across the field winding and applying reduced voltage thereto from the exciter when the motor has attained a predetermined speed, means for increasing the exciter voltage applied to the field windings a predetermined time interval after the reduced voltage is applied, and means for transferring the motor armature to receive full voltage from the supply circuit, said transfer means being effective only when the voltage developed by the exciter has a predetermined relation to the supply-circuit voltage.

3. A system for starting a synchronous motor from a supply source comprising means for applying a reduced voltage to the motor armature from the supply source, means for shunting the motor field winding during starting, an exciter disposed to vary its voltage in accordance with the speed of the motor, means for removing the shunt from the field winding and applying a low voltage thereto from the exciter responsive to the overbalancing of the induced field current by the exciter voltage, means including a time-delay relay for increasing the voltage of the exciter as the motor attains synchronous speed, and means for transferring the armature from reduced voltage to full line voltage only when the voltage of the exciter attains a predetermined relation to that of the supply source, said means being disposed to cooperate in the control of the reduced-voltage applying means.

4. In a motor-starting system, in combination, a synchronous motor provided with armature and field windings, a source of power for the motor having a low-voltage starting tap, an exciter disposed to be actuated by the motor for energizing its field winding, means operable to connect the armature winding to the low-voltage starting tap, a field-shunting resistor, means for establishing a field-shunting circuit to include the resistor, said means being further disposed to interrupt the shunt circuit and connect the motor field winding to the exciter in response to a predetermined exciter voltage, a time-delay relay disposed to respond to the operation of the means for connecting the exciter to the field winding for effecting a predetermined increase in the exciter voltage, a running switch for connecting the motor armature direct to the source, and a balance relay responsive to a predetermined relation between the voltage of the source and the voltage generated by the exciter for effecting the disconnection of the motor armature from the low-voltage starting tap and a reconnection of said armature through the operation of the running switch.

5. In a motor-starting system, in combination, a motor, a source of power for the motor, said power source being provided with a low-voltage starting tap and a full-voltage running tap, switches for connecting the motor to the power source, an exciter for supplying excitation to the motor, said exciter being driven by the motor, a transfer switch for controlling the operation of the connecting switches, a balance relay for controlling the operation of the transfer switch, said relay being provided with differentially-acting windings disposed to be energized from the power source and from the exciter, thereby to control the transfer operation from the low-voltage tap to the high-voltage tap when the exciter voltage and, consequently, the motor speed and the voltage of the high-voltage tap have a predetermined relation.

6. A starting system for a synchronous motor comprising a low-voltage starting source and a full-voltage running source, starting and running switches for connecting the motor armature winding to said sources, a field switch disposed to shunt the motor field winding when in an open position and to connect the field winding to an exciter generator driven by the motor when in the closed position, said exciter having a field-controlling resistor, means for closing the starting switch, means responsive to the voltage of the exciter generator for closing the field switch, means for shunting the field-controlling resistor in the generator field circuit a predetermined time interval after the closure of the field switch to increase the exciter voltage, and means for effecting an opening operation of the starting switch and a closing operation of the running switch responsive to the attainment of a predetermined relation between the increasing exciter voltage and the voltage of the running source.

7. In a starting system for a synchronous motor having an exciter, means for applying a reduced voltage to the motor armature from a supply circuit, means for limiting the induced current in the field winding of the motor during starting, means for connecting the field winding to the exciter in accordance with a predetermined increase in exciter voltage, means for automatically increasing the exciter voltage and, consequently, the motor excitation in response to the acceleration of the motor to synchronous speed, means for applying the full voltage of the supply circuit to the armature, and means for preventing the application of the full circuit voltage to the armature until the exciter voltage reaches a predetermined relationship with respect to the full circuit voltage.

8. In a system for starting a synchronous motor, in combination, a motor provided with armature and field windings, a low-voltage starting source and a high-voltage running source for the motor, an exciter actuated by the motor for energizing the motor field winding, a starting switch for energizing the motor from the low-voltage source, a running switch for connecting the motor directly to the high-voltage running source, a relay for controlling the excitation of the motor field winding, said relay being responsive to a predetermined balance between the induced field current and the exciter voltage for connecting the exciter to the field winding while developing a reduced voltage, a time-delay relay actuated in response to the operation of said exciter-connecting relay for effecting an increase in the exciter voltage over that which results from the increasing speed of the exciter alone, and a balance relay for controlling the operation of the starting and running switches, said relay being initially subjected to the high voltage from the running source and to zero exciter voltage to start the motor and actuated in response to a predetermined relation obtaining between the exciter voltage and the running voltage.

In testimony whereof, I have hereunto subscribed my name this 28th day of January, 1928.

MAURICE E. REAGAN.